Jan. 23, 1968  J. B. ANDERSON  3,364,918
KETTLE OR THE LIKE
Filed Oct. 28, 1965
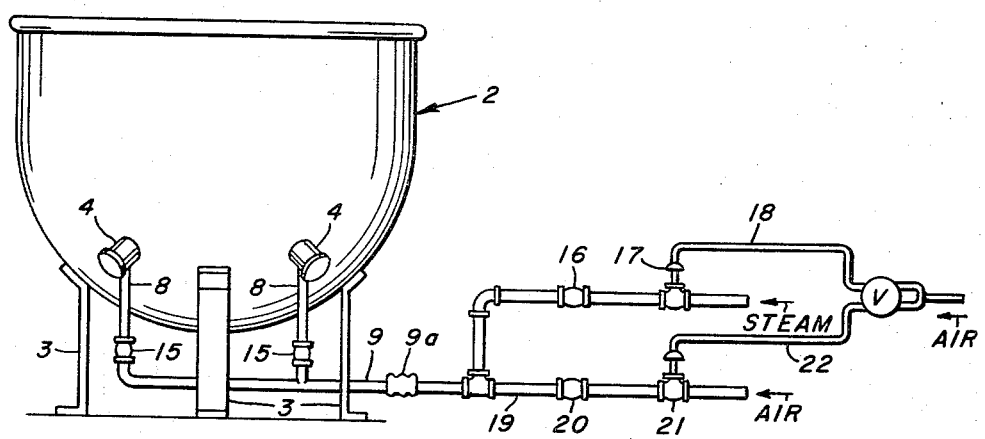
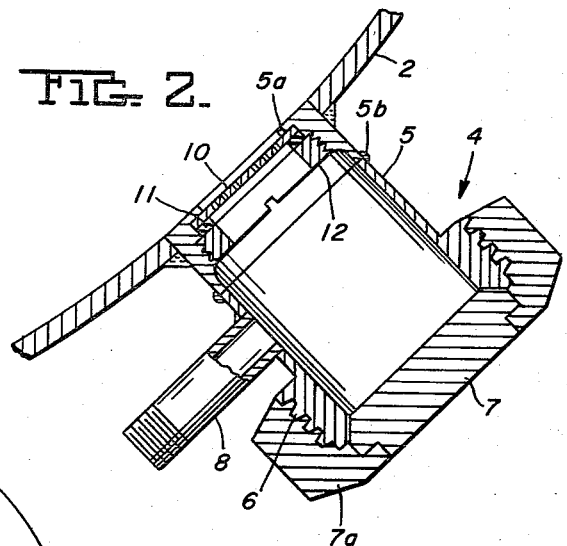
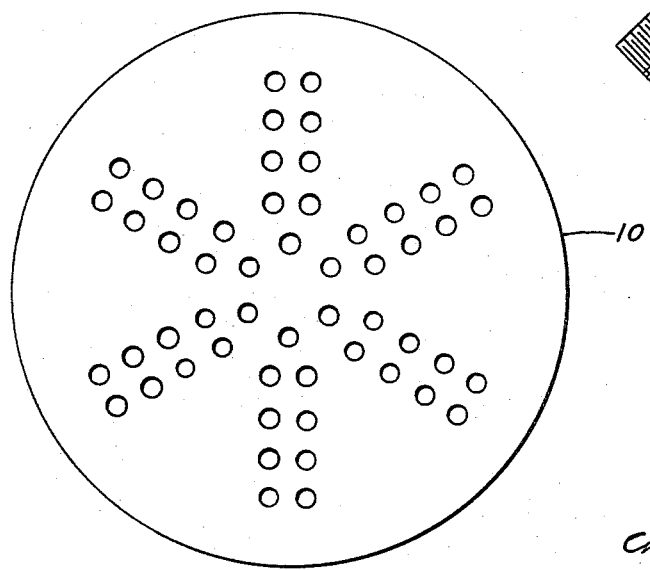
INVENTOR.
JAMES B. ANDERSON
BY
Attorneys United States Patent Office 3,364,918
Patented Jan. 23, 1968

3,364,918
KETTLE OR THE LIKE
James B. Anderson, Mount Lebanon Township, Allegheny County, Pa., assignor to H. J. Heinz Company, Pittsburgh, Pa., a corporation of Pennsylvania
Filed Oct. 28, 1965, Ser. No. 505,522
8 Claims. (Cl. 126—379)

ABSTRACT OF THE DISCLOSURE

A liquid heater is disclosed wherein steam is introduced into a kettle containing the liquid to be heated from one or more small chambers formed in the walls of the kettle through diffuser plates containing small openings in such manner as to agitate the contents of the vessel while a reverse flow of liquid into the chambers is prevented by the steam. Provision is made for introducing a noncondensable gas into the chambers instantly upon shutting off the steam to prevent back flow of the contents of the kettle when cooking must be stopped and the steam condenses.

---

This invention is for a kettle for the cooking of liquids, and more especially it is for a kettle or other vessel wherein heating or cooking of the contents within the kettle is effected by the direct admission of steam into the product being heated.

The term "liquid" as used herein contemplates readily flowable liquids and also viscous and semi-liquid products, such as porridge or cereals, stews, where condensation of steam in the product is not objectionable.

The invention provides a liquid heater wherein steam is introduced into a kettle or other vessed containing the liquid to be heated from one or more small chambers formed in the walls of the vessel through diffuser plates containing small openings in such manner as to agitate the contents of the vessel while a reverse flow of liquid into the chambers is prevented by the steam. When the heating or cooking process is completed, provision is made for supplying air under pressure to the chambers until such time as the vessel is emptied or steam is again turned on, thereby relieving suction due to condensation of the remaining steam in the chambers.

The invention has for its principal object to provide a liquid heater or cooker of the type wherein steam is injected directly into a liquid which is of unique construction and especially well-adapted to the commercial preparation of food products in an efficient manner, and which is easily cleaned after it has been used.

The invention will hereinafter be described in connection with a conventional large size round bottom kettle of a type extensively used in the preparation of relatively large batches of food products, but it will be understood that this is by way of illustration and that the invention is applicable to vessels of other types and shapes.

In the accompanying drawings:

FIG. 1 is a side elevation of a cooking kettle embodying my invention, and also shows schematically a piping arrangement for steam and air;

FIG. 2 is a fragmentary view, mostly in vertical section, of one of the steam injector units; and FIG. 3 is an elevation of one of the steam inlet diffuser plates, the view being on a larger scale than FIG. 2.

Referring to the drawings, 2 designates a vessel for holding liquid to be heated, and is here shown to be in the form of a kettle with a rounded bottom and having supporting legs 3.

According to the present invention there is secured to the wall of the vessel one or more steam admission elements, designated generally as 4. Preferably there are several of these units more or less equally spaced around the vessel. Typically, the kettle shown in FIG. 1 would have four such units, spaced 90° from each other, so that only two of them are visible in this elevation. They are preferably located at a level closer to the lowest portion of the kettle than to the top so that the contents of the vessel will normally submerge these units to a substantial depth.

Each unit comprises a hollow cylindrical body 5 welded around its inner edge into the wall of the kettle and having an outer end 6 which is externally threaded with a sanitary thread used in food processing equipment onto which is screwed a sanitary seal comprising a cap 7 and a flanged hexagonal sealing nut 7a. Intermediate the ends of the body which is here shown as being formed of two parts welded or otherwise connected at 5b is a steam inlet pipe 8. The interior of the body 5 forms a steam chamber.

The inner end of the body is flanged at 5a to support a perforated steam diffuser plate 10. There is a gasket 11 at the back of this plate. An externally-threaded ferrule 12 is screwed into a correspondingly threaded offset in the internal wall of the cylinder to bear against the gasket 11 and retain the plate 10 in place.

When steam is introduced into a relatively cold liquid it condenses rapidly, resulting in a loud crackling sound. This is avoided in the present invention by introducing the steam through a number of small holes arranged in the diffuser plate 10. These holes are each desirably of the order of $\frac{1}{16}$ to $\frac{3}{16}$ of an inch in diameter an constitute altogether an area which is but a small fraction of the total area of the plate, their total area being between about 0.06 sq. in. and about 0.37 sq. in. for a disc having an area exposed to the liquid with a diameter of about 1⅜ in. As shown in FIG. 3 the holes are arranged so that the center of the disc is closed and there are parallel rows of generally radial holes, the rows of holes being at each side of radii 60° apart, since this arrangement enables liquid to circulate in against the plate and then be carried away from the plate by steam, and so maintain a desirable circulation of liquid in the kettle. The temperature and velocity of the steam may vary with different products and different cooking time, but in any event it is desirable for the steam to emerge from the holes in jet-like streams that carry into the product and maintain circulation.

Each of the steam pipes 8 is connected to a steam supply pipe 9 and there is a check valve 15 in each pipe 8 that allows steam to flow into units 4, but prevents any reverse flow of fluid. As a further precaution there is a check valve 16 in the common steam supply line that opens in the same direction. The flow of steam is regulated by a control valve 17 that may be of an air-operated diaphragm type, which in turn is controlled through air supplied through pipe 18. Supply pipe 9 is shown as including a flexible connection 9a.

There is also an air supply pipe 19 connected into the pipe 9. This pipe has a check valve 20 therein that permits the flow of air under pressure toward the kettle, but prevents any reverse flow. The flow of air through pipe 19 may also be controlled by an air-operated diaphragm valve 21 to which there is connected air pipe 22 for operating the valve. Air pipes 18 and 22 may be connected through a common operating dual valve according to which both diaphragm valves 17 and 21 may be closed, or one valve open when the other is closed, but ordinarily both diaphragm valves would never be open at the same time. This type of valve-operating means is known in the art, and forms no part of the present invention. Diaphragm valves 17 and 21 are used only for convenience in providing for remote or automatic control and could of course be manually operated.

In operation, during the heating up of the liquid, steam is supplied through pipe 9 and introduced directly through the plates 10 into the liquid in the kettle and steam pressure in conjunction with the small holes in the plate and the arrangement of the holes prevents liquid from entering the steam chamber. When cooking is terminated, the steam is shut off at the same instant air under pressure is supplied to pipe 9, but the air pressure is adjusted to closely counteract the hydrostatic pressure of the liquid in the kettle, but normally there is a minimum flow of air into the contents of the kettle. The air replaces the steam which almost instantly condenses whereas the air being a gas and not a vapor does not condense and thereby prevents a decrease in pressure in the steam chambers and supply pipes such as would then result in backflow of liquid from the kettle into the several steam chambers, where an accumulation of liquid might solidify or caramelize to the detriment of subsequent operations. Cooking may thus be safely stopped at the exact time when it should be stopped to prevent overcooking of heat sensitive products but backflow of kettle contents into the steam chambers cannot occur. It is generally not desirable to introduce air in sufficient amount to actually escape into the contents of the kettle, and for some products a more inert non-condensible gas, such as nitrogen, could be employed as a non-condensible gas for this purpose. When the kettle is being taken out of use, the cap 7 may be removed after which the ferrule 12, the gasket 11 and diffuser plate 10 may all be removed for cleaning. A number of small steam emitting units as described spaced around the kettle with only the small area of the discs exposed to the contents of the kettle avoids any large heated area against which the contents of the kettle may lie and onto which the contents may be scorched.

While I have shown and specifically described a preferred embodiment of my invention, it will be understood that the invention is not restricted to the particular construction shown and may be otherwise embodied under the scope of the following claims.

I claim:

1. Apparatus for heating liquids by the direct admission of steam into the liquid to be heated comprising:
    a vessel having a wall structure for holding the liquid to be heated, a plurality of hollow bodies located on the vessel wall in spaced relation to each other, each of the hollow bodies providing a steam chamber opening into the vessel,
    a diffuser plate confined in each of the hollow bodies across the openings into the vessel, each of the diffuser plates having a plurality of perforations through which steam passes from the chambers into the vessel, and
    a common steam supply pipe with a flow control valve therein connected to each of the hollow bodies for introducing steam under pressure into the chambers.

2. Apparatus for heating liquids as defined in claim 1 wherein means is also provided for introducing a non-condensible gas into the chambers and the supply pipe between the steam flow control valve and the several chambers for preventing backflow of the vessel contents into the chamber when the steam supply is terminated.

3. Apparatus for heating liquids as defined in claim 2 wherein said means for introducing a non-condensible gas into the chambers comprises a supply pipe joined to the steam pipe, and valve means for selectively controlling the flow of gas and steam.

4. Apparatus for heating liquids as defined in claim 3 in which the steam supply pipe has a check valve therein that opens to the flow of steam into the chambers but prevents any reverse flow.

5. Apparatus for heating liquids as defined in claim 4 in which the vessel is a kettle, and each of the hollow bodies is located intermediate the top and bottom of the kettle and closer to the bottom than to the top.

6. Apparatus for heating liquids by the direct admission of steam into the liquid to be heated comprising:
    a vessel having a wall structure,
    a hollow cylindrical body sealed at one end to the wall structure providing a chamber opening into the body,
    a perforate disc removably confined in the interior of the body across the opening into the vessel,
    a closure removably secured to the other end of said body, and
    a steam supply pipe attached to the body and opening into the chamber in the body between the perforate disc and the closure.

7. Apparatus for heating liquids as defined in claim 5 wherein each diffuser plate as the perforations arranged in pairs of radial rows with the center area of the plates being imperforate and the combined areas of the holes in each plate being substantially less than the overall area of each plate.

8. Apparatus for heating liquids by the direct admission of steam into the liquid to be heated as defined in claim 6 wherein said hollow cylindrical body is welded to the vessel and has an annular flange at its inner end, the perforate disc being positioned at its periphery against said flange, the body having internal threads inwardly from the flange and disc, an annular nut screwed into the threads in the body and arranged to confine the perforate disc against the flange, the outer end of the body being externally threaded, and a cap removably screwed onto said externally threaded end of the body for affording ready access to the interior of the body, the annular nut and the disc.

References Cited
UNITED STATES PATENTS

| | | | |
|---|---|---|---|
| 293,048 | 2/1884 | Maxim | 126—379 |
| 1,408,356 | 2/1922 | Jones | 126—379 |
| 1,781,052 | 11/1930 | Catlett | 261—124 |
| 1,471,670 | 10/1923 | Smith | 126—379 X |
| 2,604,444 | 7/1952 | Piccardo | 261—77 X |
| 3,219,427 | 11/1965 | Hymowitz | 261—124 X |
| 3,256,904 | 6/1966 | Costa et al. | 126—348 X |

KENNETH W. SPRAGUE, *Primary Examiner.*